(No Model.)
H. M. SWEET.
CLOTHES HORSE.
No. 256,513. Patented Apr. 18, 1882.
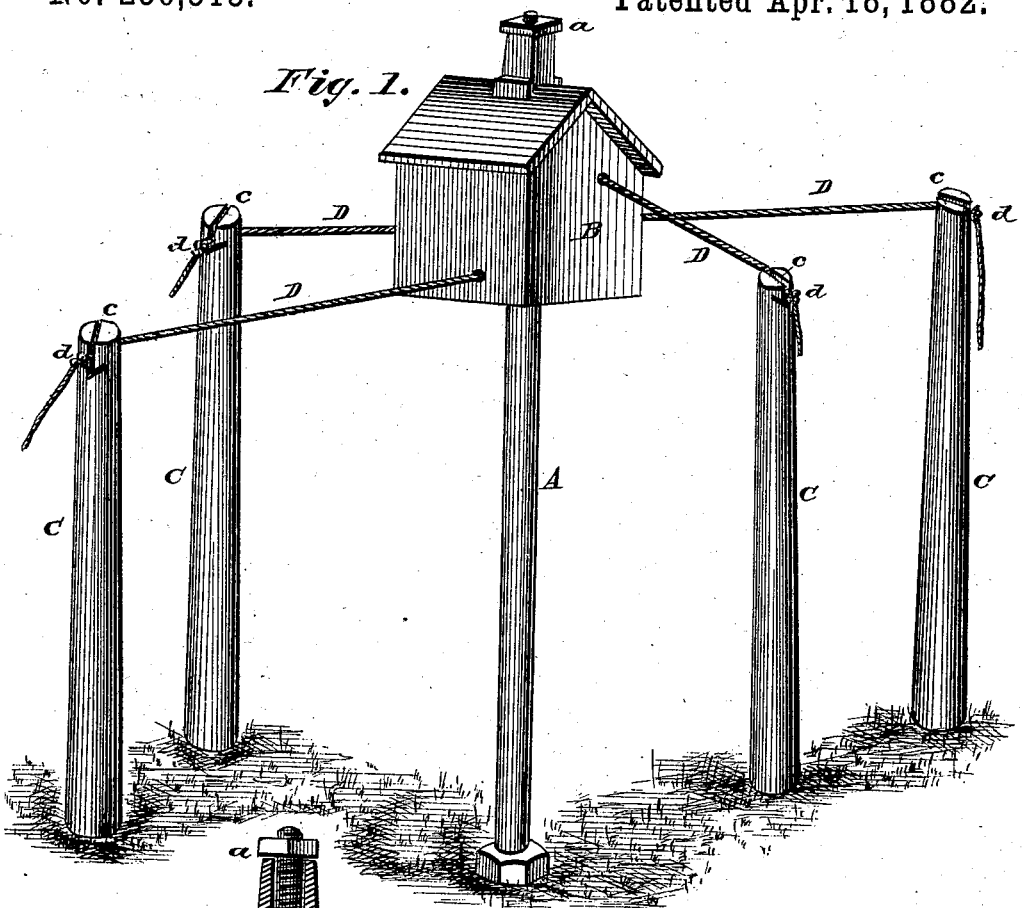
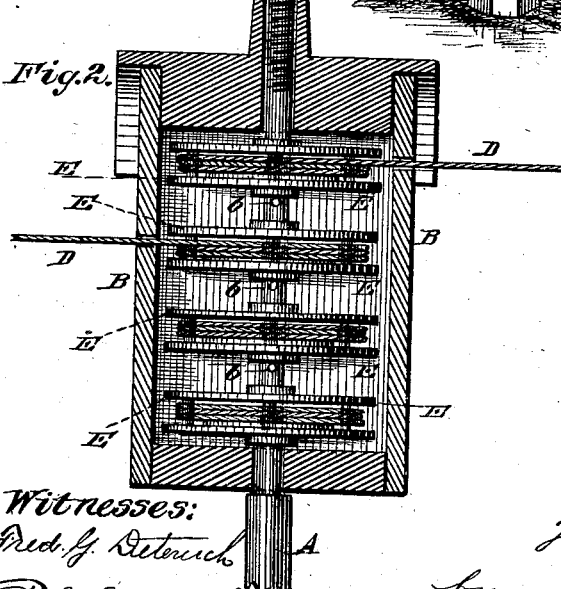
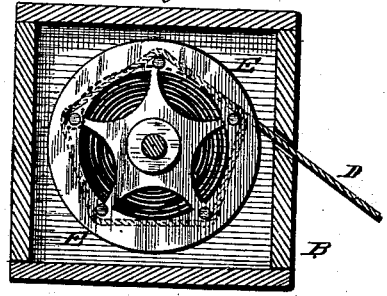
Witnesses:
Fred. G. Dieterich
P. C. Dieterich
Inventor:
Henry M. Sweet,
by James H. Mandeville,
his Attorney.

UNITED STATES PATENT OFFICE.

HENRY M. SWEET, OF WINCHESTER, CONNECTICUT.

CLOTHES-HORSE.

SPECIFICATION forming part of Letters Patent No. 256,513, dated April 18, 1882.

Application filed February 4, 1881. (No model.)

*To all whom it may concern:*

Be it known that I, HENRY M. SWEET, of Winchester, in the county of Litchfield, in the State of Connecticut, have invented a new and useful Improvement in Clothes-Horses, of which the following specification, with its drawings, is a full, clear, and exact description.

The object of this invention is to enable a clothes-line to be quickly put up for use, readily made taut, quickly housed after use, and its tie-posts well braced when the lines are stretched.

In the drawings, Figure 1 represents the line stretched for use; Fig. 2, the clothes-line house in section, and Fig. 3 the coiled-spring device for winding up the lines.

The invention consists in arranging one or more independent clothes-lines in a house, each line upon a coiled-spring reel, and all the reels upon the same perpendicular standard.

The several parts are designated as follows: A is the standard; B, the house for sheltering the clothes-lines; C, the tie-posts; D, the clothes-lines; E, the reels wound up by a coiled spring; $a$, the nut to secure the roof of the house to the standard; $b$, the pin to hold each reel in place on the standard; $c$, the slot in tie-post to receive a clothes-line; $d$, the knot at end of a line to keep it from being pulled through the slot.

The house is constructed in any ornamental manner and firmly set on its standard. The upper part of the standard is round—that portion of it within the house—and at convenient distances the standard holds one or more revolving reels, one above the other, and each reel independent of the other. Upon each reel is wound a clothes-line. A coiled spring is attached to each reel, so as to be compressed when its line is extended for use. The detaching of a line from its tie-post then allows it to be quickly wound up in the house by the uncoiling of the spring on its reel. There is a tie-post for each clothes-line, and they may be braced by carrying the lines around two or more posts. It is obvious that each line might be long enough to be carried around the entire number of tie-posts, arranging the lines in tiers one above the other. In order to effect a quick fastening of the clothes-line to the tie-post, and to avoid all necessity for tying the line, a vertical slot, $c$, is cut in the top of the post two or three inches deep and a little more than the diameter of the line in width, and upon one side of the post, under the slot, is cut a triangular notch as a part of the slot, so that when the clothes-line is stretched from the house to the post and tightened and the knot $d$ on the end of the line brought down through the slot the knot will neatly fit into the triangular notch and, aided by the weight of the line and its contents, securely hold it to the post. The act of fastening and unfastening the line thus becomes a momentary matter.

I am aware that a clothes-line house containing a coiled spring for automatically winding the line upon its reel is not new; nor do I lay any claim to the manner of securing the clothes-line to the tie-posts; but

What I claim as new, and desire to secure by Letters Patent, is—

A standard, A, and house B combined, the post extending through the house and forming a vertical shaft, whereon are secured independently by means of pins $b$ two or more coiled-spring reels, E, substantially as described.

In witness whereof I hereunto subscribe my name, in presence of two attesting witnesses, this 17th day of January, 1881.

HENRY M. SWEET.

Witnesses:
JOHN F. WYNNE,
LYMAN W. CASE.